(12) United States Patent
Lee

(10) Patent No.: US 8,976,113 B2
(45) Date of Patent: Mar. 10, 2015

(54) MOUSE HOUSING STRUCTURE

(75) Inventor: Tsung-Shih Lee, New Taipei (TW)

(73) Assignee: Cheng UEI Precision Industry Co., Ltd., New Taipei (TW)

( * ) Notice: Subject to any disclaimer, the term of this patent is extended or adjusted under 35 U.S.C. 154(b) by 465 days.

(21) Appl. No.: 13/535,339

(22) Filed: Jun. 27, 2012

(65) Prior Publication Data

US 2014/0001935 A1    Jan. 2, 2014

(51) Int. Cl.
*G06F 3/033*   (2013.01)

(52) U.S. Cl.
USPC ......................................................... 345/163

(58) Field of Classification Search
CPC ............ G06F 3/03541; G06F 3/03543; G06F 2203/0332; G06F 2203/0333; G06F 2203/0334
USPC .................................... 345/163–167; 463/37
See application file for complete search history.

(56) References Cited

U.S. PATENT DOCUMENTS

| | | | | |
|---|---|---|---|---|
| 6,304,249 | B1 * | 10/2001 | Derocher et al. | 345/163 |
| 7,379,051 | B2 * | 5/2008 | Yin et al. | 345/163 |
| 7,623,117 | B2 * | 11/2009 | Hsu | 345/163 |
| 2008/0311963 | A1 * | 12/2008 | Strawn | 455/575.1 |

* cited by examiner

*Primary Examiner* — Jimmy H Nguyen
(74) *Attorney, Agent, or Firm* — Cheng-Ju Chiang

(57) ABSTRACT

A mouse housing structure includes a housing having a main body of a front wall, and a tongue portion defining a position wall, at least a track device disposed at the tongue portion and defining first and second position ends at two opposite ends thereof, and a sliding device including a sliding body and at least a rotatable shaft having first and second engaging portions. The first engaging portion is movably and rotatably disposed in the track device, and the second engaging portion is spaced away from the track device for pivotally engaging with a coupling slot of the sliding body. When the sliding body moves forwards to where the first engaging portion slides against the first position end, the sliding body rotates towards the position wall, and is restrained by the position wall so as to expand the mouse housing structure for use.

10 Claims, 5 Drawing Sheets

MOUSE HOUSING STRUCTURE

BACKGROUND OF THE INVENTION

1. Field of the Invention

The present invention relates to a mouse housing, and particularly to a mouse housing structure that is retractable, less space occupied when not in use, and expandable for use.

2. Related Art

Types and shapes of electronic mice are many and various. Whatever the type or shape of a conventional mouse is it has a physical size which occupies a certain space whenever it is in use or not. Although a mouse can be designed as small size, they are merely suitable for users of smaller palms but not for most users.

Hence, referring to FIG. 1, a mouse 9 is improved to have a retracting portion 92 which is retractable into a casing 91 of the mouse 9 in order to reduce the size when not in use, wherein the retracting portion 92 slides along two side walls of the casing 91 to move in and out of the casing 91. However, when the retracting portion 92 moves out of the casing 91, an upper face of the retracting portion 92 retains an elevation difference and a large gap with an upper wall of the casing 91, leading to an inappropriate position with respect to the casing 91 (as shown in FIG. 2). As a result, such inappropriate position may cause the retracting portion 92 to move into the casing 91 and seriously affect the use of the mouse. Therefore, it is imperative to overcome the aforesaid drawbacks of the conventional mouse casing by improving it to be less-space occupied when not in use and to be easily smoothly manipulated for extending and retracting.

SUMMARY OF THE INVENTION

Accordingly, an object of the present invention is to provide a mouse housing structure which has a simple structure and is easily, quickly, and smoothly to be expanded for use, and is also retractable to reduce an overall size when no in use.

To achieve the above-mentioned object, a mouse housing structure of the present invention comprises a main body and a tongue portion, the main body having a front wall, and the tongue portion integrally extending from the front wall and defining a position wall at an end of the tongue portion opposite to the front wall. At least a track device disposed at a side of the tongue portion between the position wall and the front wall of the housing. A first position end and second position end respectively are defined at two opposite ends of the track device. The first position end is located adjacent to the position wall, while the second portion end is located adjacent to the main body. A sliding device is capable of sliding along the track device and comprises a sliding body and at least a rotatable shaft, the sliding body having at least a coupling slot formed at an end thereof corresponding to the track device. The shaft has a first engaging portion and a second engaging portion respectively formed at two opposite ends thereof, the first engaging portion movably and rotatably disposed in the track device, and the second engaging portion spaced away from the track device for pivotally engaging with the coupling slot.

With the above-mentioned structure, when the sliding body moves forwards to where the first engaging portion slides against the first position end, the sliding body rotates towards the position wall of the tongue portion with the rotation of the shaft, and is then restrained by the position wall so as to expand the mouse housing structure for use.

DESCRIPTION OF THE PREFERRED EMBODIMENTS

Figure 1:
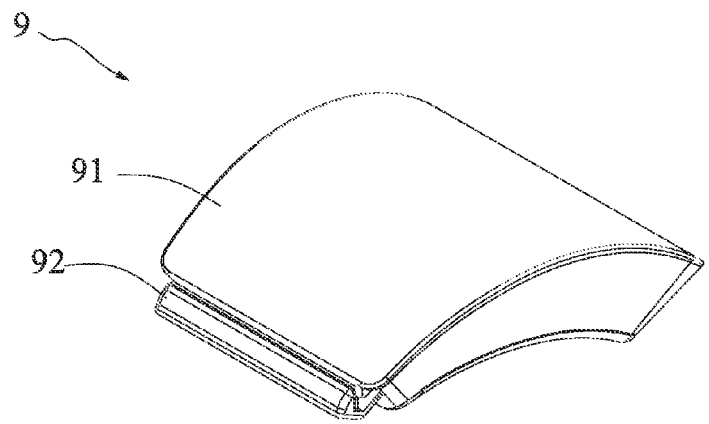
FIG. 1 is a perspective view showing a conventional mouse being retracted.
Figure 2:
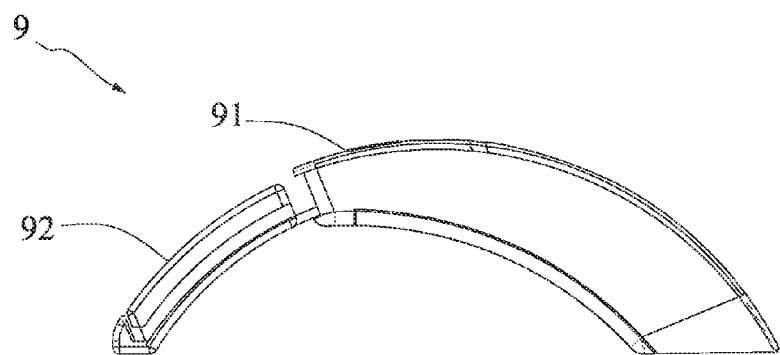
FIG. 2 is the conventional mouse of FIG. 1 being expanded.
Figure 3:
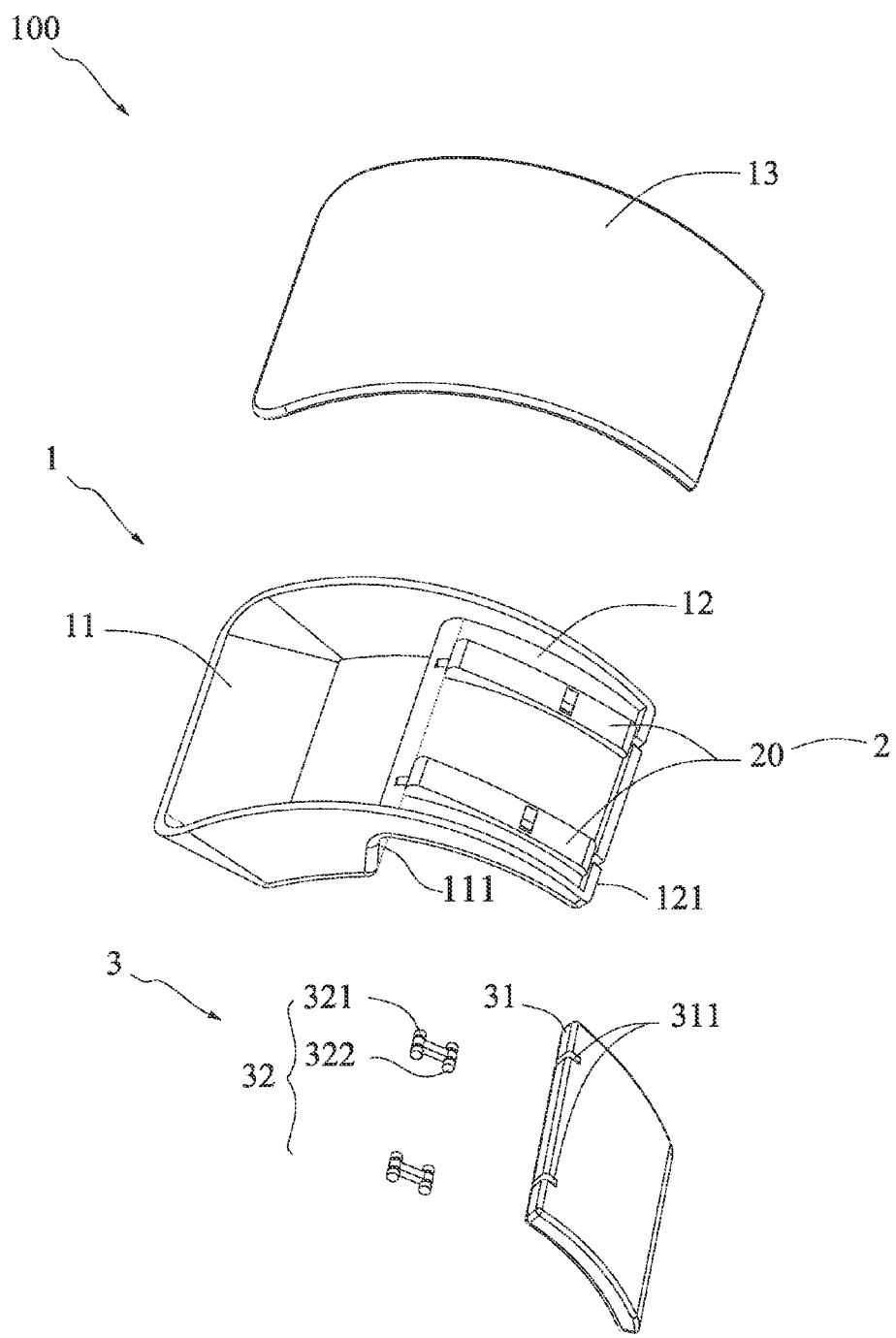
FIG. 3 is an exploded perspective view of a mouse housing structure of the present invention.
Figure 4:
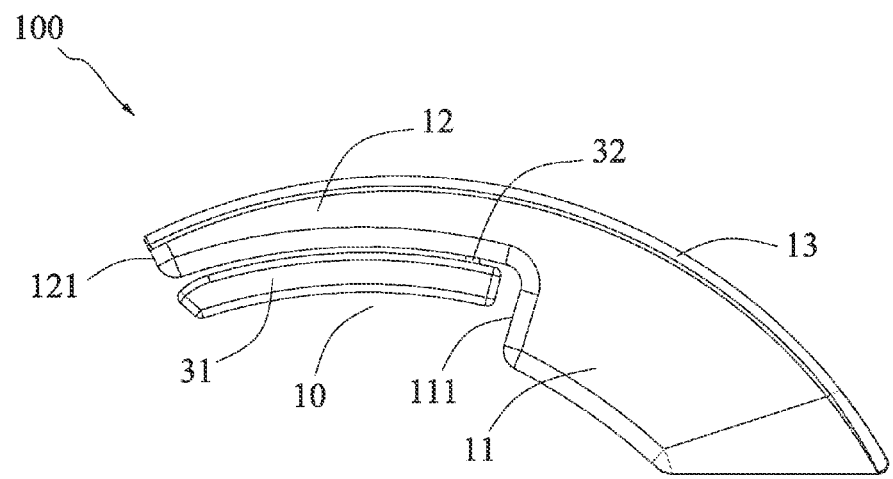
FIG. 4 is a right side elevational view of the mouse housing structure in a state of not expanding.
Figure 5:
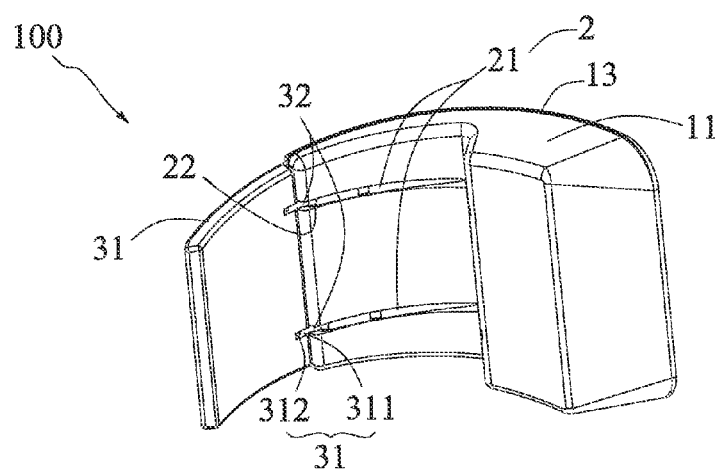
FIG. 5 is a bottom side perspective assembly view of the mouse housing structure in a state of expanding.

Referring to FIGS. 3 to 5 showing a preferable embodiment of the present invention, a mouse housing structure 100 of the present invention comprises a housing 1, two track devices 2, and a sliding device 3. The housing 1 comprises a main body 11 having a front wall 111, a tongue portion 12 spatially communicating with the main body 11, and a cover 13. The tongue portion 12 integrally extends from the front wall 111 with a bottom of the tongue portion 12 located above and connecting the front wall 111, whereby an accommodating space is defined by the tongue portion 12 and the front wall 111. Alternatively, the tongue portion 12 can extend from a middle portion of the front wall 111, or is located below the front wall 111 (not shown). Furthermore, the tongue portion 12 defines a position wall 121 at an end thereof opposite to the front wall 111. In the preferable embodiment, the main body 11 and the tongue portion 12 are curved lengthwise, and the cover 13 curved with respect to the main body 11 and the tongue portion 12 for completely covering tops of the main body 11 and the tongue portion 12 (as shown in FIG. 6).

Figure 6:
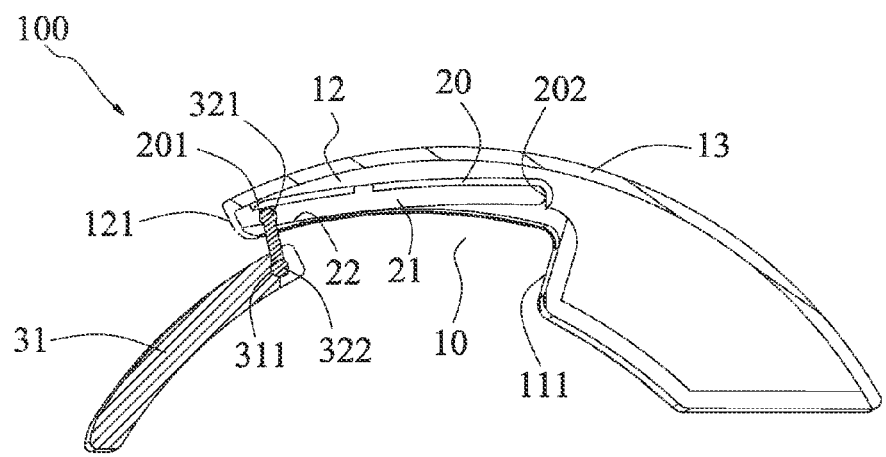
FIG. 6 is a cross-sectional view schematically illustrating a sliding device of the mouse housing structure moving towards a first position end.
Figure 7:
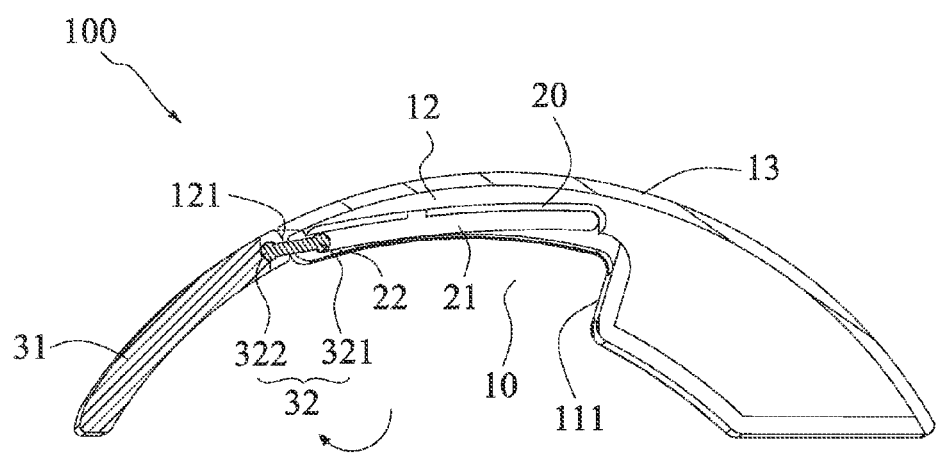
FIG. 7 is a cross-sectional view of the mouse housing structure in the state of expanding.

Referring to FIGS. 5 to 7, the two track devices 2 are parallelly spaced apart from each other and disposed at a side of the tongue portion 12 between the position wall 121 and the front wall 111. Each of the track devices 2 faces the accommodating space 10 and defines a first position end 201 and a second position end 202 respectively at two opposite ends of the track device 2, wherein the first position end 201 is located adjacent to the position wall 121, while the second portion end 202 is located adjacent to the main body 11. Both the first and second position ends 201 and 202 respectively have arc surfaces. The second position end 202 is located higher than the first position end 201 so that the track device 2 is being inclined (as shown in FIGS. 3 and 6). Furthermore, each track device 2 forms a passageway 21 which penetrates the tongue portion 12 from bottom to top and extends to penetrate the position wall 121. A guiding face 22 is defined on the tongue portion 12 adjoining the passageway 21 and opposite to the accommodating space 10. Additionally, each of the track device 2 is entirely shielded by a shielding portion 20 disposed on the guiding face 22 as shown in FIG. 3.

Figure 8:
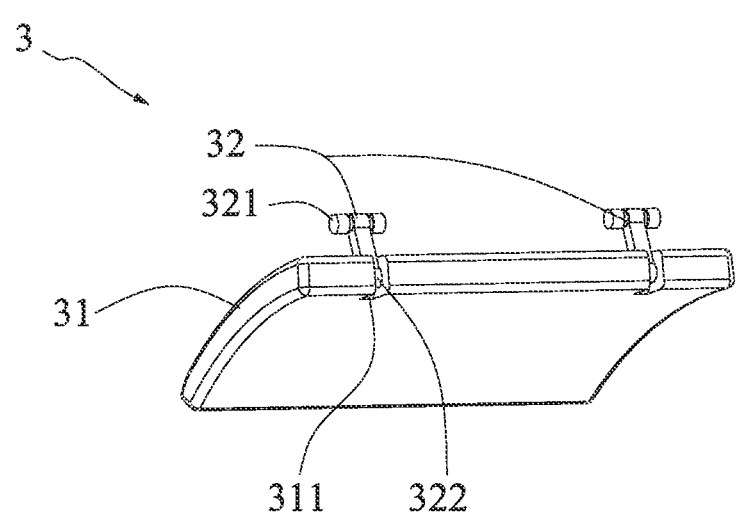
FIG. 8 is a schematic perspective view of the sliding device in accordance with the present invention.

Continuing referring to FIGS. 5 to 7, the sliding device 3 comprises a sliding body 31 and two rotatable shafts 32. The sliding body 31 has two coupling slots 311 formed at an end thereof corresponding to the track devices 2, each coupling slot 311 being provided with two supporting grooves 312 concavely formed at opposite sides of the coupling slot 311 (as shown in FIG. 5). Each of the shafts 32 has a first engaging portion 321 and a second engaging portion 322 respectively formed at two opposite ends thereof. Each of the first and second engaging portions 321 and 322 has a cylindrical shape extending outwardly of opposite sides of the shaft 32, and is perpendicularly to the shaft 32. The first engaging portion 321 is disposed over the passageway 21 of the track device 2 and supported on the guiding face 22. The first engaging portion 321 is movable and rotatable within the first and second position ends 201 and 202, and is shielded by the shielding portion 20 so as to limit a vertical displacement of the shaft 32. The second engaging portion 322 is spaced away from the track device 2 for pivotally engaging with the supporting grooves 312 of the coupling slot 311 (as shown in FIGS. 6 and 8). In this manner, the shaft 32 is capable of rotating with the first engaging portion 321 functioned as a pivot, and the second engaging portion 322 is capable of pivoting in coupling slot 311.

Referring to FIG. 4, when the mouse housing structure 100 is not in use, the sliding body 31 is located below and slightly spaced away from the tongue portion 12, wherein the first engaging portion 321 remains in the second position end 202. When the sliding body 31 moves forwards to where the first engaging portion 321 slides downwards against the first position end 201, the sliding body 31 rotates smoothly towards the position wall 121 with the rotation of the shaft 32, and then the sliding body 31 is restrained by the position wall 121 with one end thereof against the position wall 121, wherein an upper surface of the sliding body 31 is flush with the cover 13 and forms a continuous curve surface with the cover 13 without retaining an elevation difference. Therefore, the mouse housing structure 100 is being expanded for use. When in use, due to the curve shape of the mouse housing structure 100, only one end of the sliding body 31 opposite to the coupling slot 311, and a bottom of the main body 11 opposite to the front wall 111 are in contact with a desk (not shown) to support the mouse housing structure 100. Other portions of the mouse housing structure 100 including the tongue portion 12 and the front wall 111 keep a distance from the desk.

Likewise, when the mouse housing structure 100 is to be retracted, the sliding body 31 moves in a reverse direction with respect to the siding body 31 moving out of the accommodating space 10. That is, the sliding body 31 rotates downwards and moves backwards into the accommodating space 10 with the first engaging portion 321 sliding against the second position end 202, whereby the mouse housing structure 100 is being retracted so as to reduce the size thereof.

Furthermore, during the process of expanding the mouse housing structure 100, a frictional force is generated when the first engaging portion 321 of the shaft 32 slides along the track device 2, and a rotational force is generated when the first engaging portion 321 slides against the first position end 201 and rotates. In the preferable embodiment, a total amount of the frictional force and rotational force is less than a force of 150 gram. Therefore, only a small force is exerted to expand the mouse housing structure 100. Moreover, due to the inclined configuration of the track device 2, the sliding device 3 is capable of moving downwards smoothly to expand the mouse housing structure 100 in such a way that a user do not feel two different forces are exerted to move and rotate the sliding device 3.

Accordingly, the mouse housing structure 100 utilizes the inclined two track devices 2 and the sliding device 3 to allow the mouse housing structure 100 to be quickly and smoothly expanded for use, or retracted for storage when not in use.

It is understood that the invention may be embodied in other forms within the scope of the claims. Thus the present examples and embodiments are to be considered in all respects as illustrative, and not restrictive, of the invention defined by the claims.

What is claimed is:

1. A mouse housing structure, comprising:
   a housing comprising a main body and a tongue portion, the main body having a front wall, the tongue portion integrally extending from the front wall and defining a position wall at an end of the tongue portion opposite to the front wall;
   at least a track device disposed at a side of the tongue portion between the position wall and the front wall of the housing and having a first position end and a second position end respectively defined at two opposite ends of the track device, the first position end located adjacent to the position wall, while the second portion end is located adjacent to the main body; and
   a sliding device capable of sliding along the track device and comprising a sliding body and at least a rotatable shaft, the sliding body having at least a coupling slot formed at an end of the sliding body and being adjacent to the corresponding track device, the rotatable shaft having a first engaging portion and a second engaging portion respectively formed at two opposite ends of the rotatable shaft, the first engaging portion movably and rotatably disposed in the track device, and the second engaging portion spaced away from the track device and pivotally engaging with the coupling slot;
   wherein when the sliding body moves forwards to where the first engaging portion slides against the first position end, the sliding body rotates towards the position wall of the tongue portion with the rotation of the rotatable shaft, and is then restrained by the position wall so as to expand the mouse housing structure for use.

2. The mouse housing structure of claim 1, wherein the tongue portion and the front wall of the main body cooperatively define an accommodating space for accommodating the sliding body.

3. The mouse housing structure of claim 2, wherein the first and second engaging portions respectively extend outwardly of opposite sides of the rotatable shaft and being perpendicularly to the rotatable shaft, the at least a track device forms a passageway which penetrates the tongue portion and the position wall, a guiding face is defined on the tongue portion adjoining the passageway and opposite to the accommodating space, and the first engaging portion is disposed over the passageway and supported on the guiding face.

4. The mouse housing structure of claim 3, wherein the at least a coupling slot is provided with two supporting grooves concavely formed at opposite sides of the coupling slot for pivotally connecting the second engaging portion.

5. The mouse housing structure of claim 1, wherein each of a number of said at least a track device and said at least a rotatable shaft is two, respectively, and the two track devices are parallelly spaced apart from each other, the two rotatable shafts movably and rotatably engaged with the two track devices.

6. The mouse housing structure of claim 1, wherein the first and second position ends respectively have arc surfaces.

7. The mouse housing structure of claim 1, wherein the second position end is located higher than the first position end so that the track device is being inclined.

8. The mouse housing structure of claim 1, wherein the main body and the tongue portion are curved lengthwise, and the housing further comprises a cover curved with respect to the main body and the tongue portion for completely covering tops of the main body and the tongue portion.

9. The mouse housing structure of claim 8, wherein an upper surface of the sliding body is flush with the cover when the sliding body moves and is positioned against the position wall.

10. The mouse housing structure of claim 1, wherein a frictional force is generated when the first engaging portion of the rotatable shaft slides along the track device, a rotational force is generated when the first engaging portion slides against the first position end and rotates, and a total amount of the frictional force and rotational force is less than a force of 150 gram.

* * * * *